Patented Jan. 17, 1939

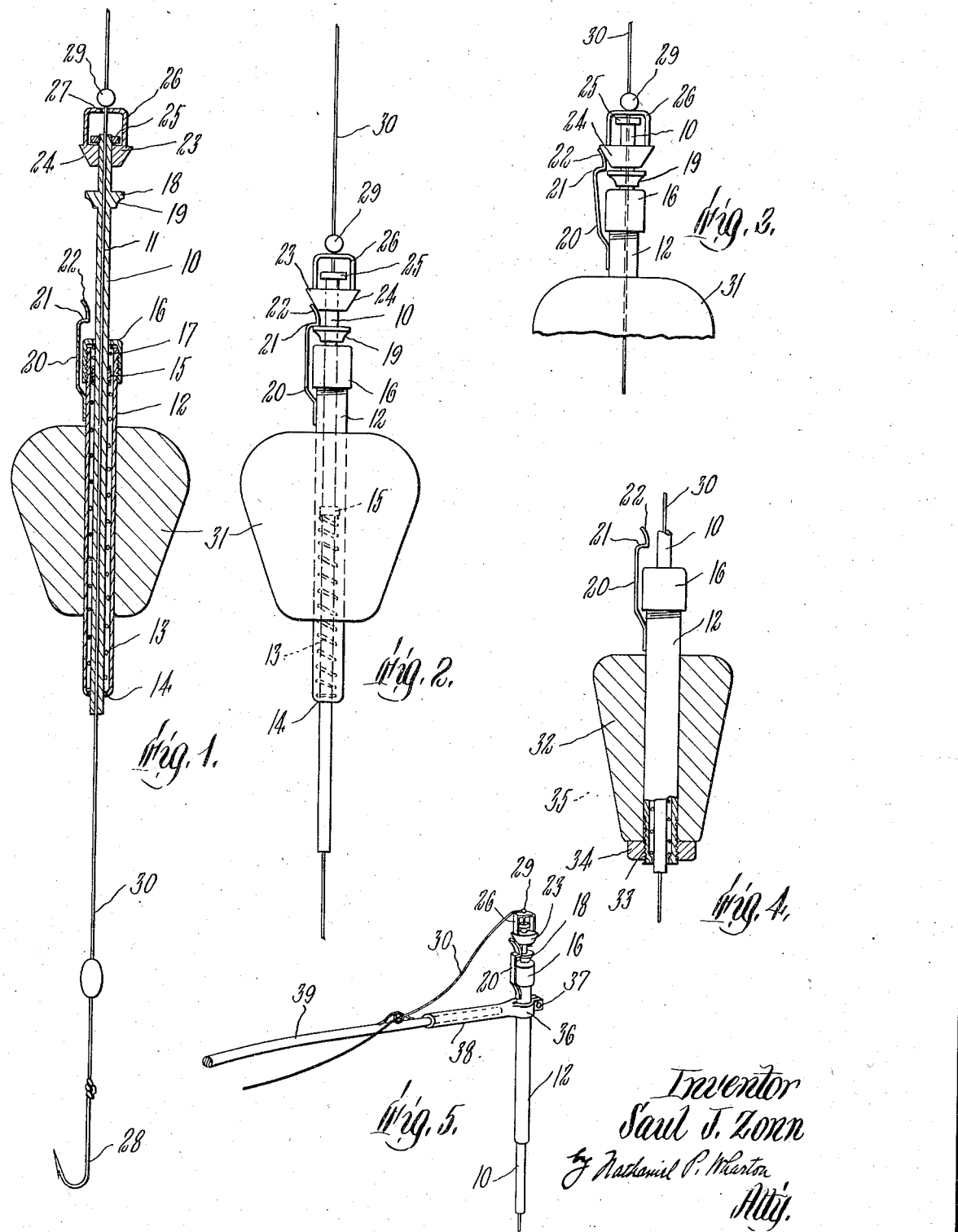

2,144,175

UNITED STATES PATENT OFFICE 2,144,175

AUTOMATIC FISH TRAP

Saul J. Zonn, Milton, Mass.

Application May 23, 1938, Serial No. 209,473

5 Claims. (Cl. 43—15)

This invention relates to an automatic fish-trap, namely, one that may be set out by the fisherman and perform its fish-trapping function automatically as soon as the fish bites, that is, without any attention or exertion by the fisherman.

The fish-trap of the present invention is a simple, compact, inexpensive, and long-enduring mechanism which can be used advantageously in the absence of a fishing rod for surface-water and deep-water fishing and which is also readily attachable at the end of a fishing rod. It comprises, generally stated, an elongated plunger bored from one end to the other, an open-ended shell through which the plunger passes, a compression coil spring arranged within the shell and encompassing the plunger, the plunger being engaged by the upper end of the spring but being pushable toward the lower end of the shell to compress the spring, means for locking or catching the plunger in spring-compressing position, a fishing line passing through the plunger and including a stop at the upper end of the plunger, and means actuated by a pull or tug, as by a biting fish, at the lower end of the line to unlock or release the plunger and thus permit recoil of the spring to take place, thereby causing the plunger to jerk the line upwardly so as to hook the fish.

With the foregoing and other features and objects in view, the instant invention will now be described in further detail with particular reference to the accompanying drawing, wherein, Figure 1 is a section through one form of trap embodying the present invention, the trap being in sprung condition and being equipped with a float for surface-water fishing.

Figure 2 is a side elevation of the trap set or unsprung to catch a fish.

Figure 3 is a similar view of the upper trap portion and shows the plunger just as it is being released or unlocked from spring-compressing position.

Figure 4 is a side elevation of another form of trap equipped with a sinker for deep-water fishing, some of the parts being omitted and the sinker and other parts being shown in section for the sake of clarity.

Figure 5 depicts in perspective the trap hereof equipped with an adjunct enabling ready attachment to the end of a fishing rod.

As appears best in Figure 1, the trap hereof comprises an elongated plunger or rod 10 having a fine bore or opening 11 extending therethrough from its upper to its lower end. The plunger passes through an open-ended tubular shell 12 within which there is a compression coil spring 13 which encompasses the plunger and its lower end engages an inturned lower-end shell portion 14 and its upper end bears against an annular abutment or collar 15 fixed to the plunger. The upper end portion of the shell may have screwed thereonto an apertured cap 16 through whose aperture the plunger 11 passes. Surrounding the plunger 10 and located between the cap 16 and the collar 15 may be a small coil spring 17 serving to cushion or absorb the shock of the collar 15 when the plunger is released from its unsprung position shown in Figure 2 to its sprung or normal position shown in Figure 1.

The plunger upper end portion, which normally continues well beyond the upper shell end, has a shoulder 18 upwardly removed from the upper shell end and presenting a downwardly tapering wall 19. Such shoulder and a springy member 20 projecting from the shell upwardly beyond the upper shell end coact to lock the plunger in spring-compressing or unsprung position, the member 20 having an inturned catch portion 21 adapted to catch over the shoulder when the plunger is pushed downwardly against the compression spring 13 and having above such inturned portion 21 an outturned upper end portion 22 shaped substantially complementally with the tapering shoulder wall 19 so as to be forced outwardly by such wall, as the plunger is pushed downwardly, until the inturned portion 21 snaps inwardly and catches over the shoulder, as shown in Figure 2.

A catch-release element 23 is slidably mounted on the plunger above the shoulder 18 and has a downwardly tapering wall 24 adapted upon downward movement of such element to force the outturned end portion 22 of the springy member 20 outwardly until its catch portion 21 has been disengaged from the shoulder so as to enable the spring 13 to recoil and thereby to force the plunger upwardly to its normal sprung position. The plunger has an outwardly flanged or headed upper end portion 25, between which portion and the shoulder 18 the catch-release element 23 is movable. Projecting upwardly from the element 23 and over the plunger head 25 is a stirrup or U-shaped piece 26 containing an aperture 27 through which the fish line 30 passes down through the plunger bore 11 and out through the lower end of the plunger. A fish hook 28 is tied to the lower end of the line, there being sufficient length of line from the lower end of the plunger to permit the baited hook to dangle freely and thus to attract fish. The line carries a stop 29, for instance, a metal bead, immediately above the stirrup 26, wherefore, there is a fixed length of line between the hook and the stop element.

When the trap is set out for fishing in water in the unsprung condition shown in Figure 2 and a fish bites on the baited hook 28, the pull or tug of the fish, incident to its weight and movement, on the line 30 causes the stop 29 to move the stirrup 26 and catch-release 23 downwardly until the catch-portion 21 of the springy member 20 has been released or disengaged from the shoulder 18 and the plunger 10 has been suddenly thrust upwardly and thereby to jerk the line upwardly with attendant hooking of the fish. The springy member 20 may be metallic ribbon or wire of such springiness or sensitivity that the wedge action of the release 23 immediately disengages it from the shoulder 18 even upon a very light pull or tug on the lower end of the line 30; and the compression coil spring 13 may be sufficiently compressed to thrust the plunger 10 upwardly so suddenly and to such a distance upon recoil that hooking of the fish is practically assured immediately after the fish bites.

For surface-water fishing, a conically-shaped body 31 of cork or equivalent buoying material of suitable volume may be used to float the trap. The body 31 may be axially apertured to enable its being forced over the tubular shell 12 from the lower shell end and to be held in place on the shell frictionally. The floating trap may be set out in water with the line 30 extending from the water to a fishing pier, to a fisherman's boat, or to any other desired location.

For deep-water fishing, the trap hereof may comprise a leaden or other sinkable body 32 fixed to the tubular shell 12, as illustrated in Figure 4. Thus, the body 32 may be apertured so as to be passed over the shell 12 from the lower shell end; and the lower end portion 33 of the shell may be threaded for the reception of a nut 34 serving to hold the body 32 in place on the shell. It should be obvious that the body 32 may vary in its weight, depending upon the depth of the fishing to be done.

When the fisherman is fishing, as from a boat or pier, with a rod and wishes to rest or nap or even leave the scene temporarily while his line is still cast for fish, the fish-trap hereof may be attached to the end of the rod and be cast into the water while the rod is left suitably fastened down at its grip end. For such purpose, the trap hereof may, as shown in Figure 5, be equipped with an adjunct one end portion of which is in the form of a split ring or clamp 36 capable of being clamped tightly about the tube 12, as by a screw-headed bolt 37, and the other end portion of which is in the form of an elongated socket 38 capable of being engaged and frictionally held in place over the tapered end portion of the usual fishing rod 39. The trap hereof thus attached at the end of a fishing rod may perform its fish-catching work while the fisherman is paying no attention thereto.

An important feature of the fishing trap hereof is that the fishing line passes vertically through its plunger 10 and that the weight of the fish participates substantially to the fullest potential extent in releasing the lock or catch that holds the plunger in spring-compressing condition, no matter in which direction the line extends or emerges from the lower end of the plunger. Again, such tug or pull as is exerted by the fish on the line is increased by the wedge action of the catch-release 23, in consequence of which the trap hereof is so sensitive as almost invariably to catch a fish, once it bites; but it is not so sensitive as to be accidentally released during fishing from its unsprung or set condition. When the trap hereof is used with a float for surface-water fishing, its important elements, including the plunger-catch or trigger and the catch-release, are above the water line so that there is no danger of such elements being fouled by such extraneous matter as may be present in the water. However, the various parts of the trap hereof are easily accessible for cleaning in the event that they do become fouled; and when impaired or worn, they are easily replaced by new parts. It might be noted that the extent of upward movement or thrust of the plunger and, accordingly, the extent of upward jerking of the line for hooking the fish is subject to considerable variation in the trap hereof, but may be in the order of magnitude of about 1 to 2". The extent of movement of the catch-release or slidable wedge 23 need be only a small fraction of an inch, say, ⅛ to ¼". The length of line emerging from the lower end of the plunger 10 is also subject to variation, since the stop 29 may be affixed to the line after any desired length of line has been threaded and drawn through the bore of the plunger. In other words, it is possible to adjust the length of line dangling from the trap hereof, especially in the case of surface-water fishing, to that depth at which it is judged the fish are most likely to bite.

I claim:

1. An automatic fish-trap comprising an elongated plunger bored from one end to the other, an open-ended shell through which the plunger passes, a compression coil spring arranged within the shell and encompassing the plunger, the plunger being engaged by the upper end of the spring but being pushable toward the lower end of the shell to compress the spring, means for releasably locking the plunger in spring-compressing position, a fishing line passing through the plunger and including a stop at the upper end of the plunger, and means on said plunger actuated by pull at the lower end of the line to unlock the plunger from spring-compressing position and permit recoil of said spring, thereby causing the plunger to jerk the line upwardly so as to hook the fish.

2. An automatic fish-trap comprising an elongated plunger bored from one end to the other, an open-ended shell through which said plunger passes, said plunger having an upper end portion projecting beyond the upper shell end, a compression spring arranged within said shell and encompassing said plunger, said plunger being engaged by the upper end of said spring but being pushable toward the lower end of said shell to compress said spring and said shell and plunger comprising elements adapted to interengage when said plunger is pushed toward the lower end of said shell and to lock said plunger releasably in spring-compressing condition, a fish-line passing through said plunger and including a stop at the upper end of said plunger and a fish hook at its lower end, and means on said plunger actuable by downward movement of said stop induced by a fish biting on said hook to disengage said elements and cause recoil of said spring with attendant upward thrust of said plunger and upward jerking of said line.

3. An automatic fish-trap comprising an elongated plunger bored from one end to the other, an open-ended shell through which said plunger passes, said plunger having an upper end portion projecting beyond the upper shell end, a compression coil spring arranged within said shell and encompassing said plunger, said plunger being engaged by the upper end of said spring but being pushable toward the lower end of said shell to compress said spring and said shell and plunger being equipped with elements automatically engaging one another when said plunger is pushed toward the lower end of said shell and locking said plunger releasably in spring-compressing position, a member slidably mounted on said plunger above said elements and slidable downwardly to disengage them, said member comprising an apertured portion above the upper end of said plunger, and a fish-line passing through said apertured portion and through said plunger and including a stop immediately above said apertured portion and a fish hook at its lower end, whereby, when a fish bites at said hook with said plunger locked in spring-compressing condition, said member is caused to slide downwardly until it disengages said elements and said plunger is thrust upwardly by the recoil of said spring to jerk said line upwardly so as to hook the fish.

4. An automatic fish-trap comprising an elongated plunger having a bore extending therethrough from one end to the other, an open-ended shell through which said plunger passes, a compression spring arranged within said shell and encompassing said plunger, said plunger having an abutment against which the upper end of said spring bears and having a downwardly tapering shoulder spaced upwardly from the upper shell end, a springy member projecting from said shell upwardly beyond the upper shell end and adapted to catch over said shoulder when said plunger is pushed downwardly against said compression spring, said member being of a form to be pushed outwardly by the downward movement of said downwardly tapering shoulder and then to snap inwardly to catch over said shoulder, a downwardly tapering catch-release slidably mounted on said plunger above said shoulder and adapted upon downward movement to release said springy member from said shoulder, and a fishing line passing through said plunger and including a fish hook at its lower end and a stop immediately above said catch-release, whereby, when a fish bites on said hook, with said plunger caught by said springy member in spring-compressing position, said stop moves said downwardly tapering catch-release downwardly to release said springy member from said shoulder and causes said compression spring suddenly to recoil and thrust said plunger upwardly with attendant upward jerking of the line and hooking of the fish.

5. An automatic fish-trap comprising an elongated plunger having a bore extending therethrough from one end to the other, an open-ended shell through which said plunger passes, a compression coil spring arranged within said shell and encompassing said plunger, said plunger having an abutment against which the upper end of said spring bears and having a shoulder spaced upwardly from the upper shell end and presenting a downwardly tapering wall, a springy member projecting from said shell upwardly beyond the upper shell end and having an inturned catch portion adapted to catch over said shoulder when said plunger is pushed downwardlly against said compression spring, said member having above its inturned portion an outturned end portion shaped substantially complementally with said tapering shoulder wall and being adapted to be forced outwardly by said wall, when said plunger is pushed downwardly, until said inturned portion snaps inwardly and catches over said shoulder, a catch-release slidably mounted on said plunger above said shoulder and having a downwardly tapering wall adapted upon downward movement to force the outturned end portion of said springy element outwardly until said catch portion has disengaged said shoulder, said plunger having a headed upper end portion between which portion and said plunger shoulder said catch-release is movable, an apertured stirrup projecting upwardly from said catch-release over the upper end of said plunger, and a fishing line passing through the aperture in said stirrup and thence through the bore of said plunger and out through its lower end, said line carrying a fish hook at its lower end and a stop immediately above said stirrup, whereby, when a fish bites on said hook, with the plunger pushed downwardly against said compression spring and the inturned catch portion catching over said shoulder, the weight and activity of said fish causes said stop to move the stirrup and catch-release downwardly to release said catch portion from said shoulder and cause said spring to recoil with attendant upward thrust of said plunger and upward jerk of the line to hook the fish.

SAUL J. ZONN.